(12) United States Patent
Kohno (10) Patent No.: US 6,249,383 B1
(45) Date of Patent: Jun. 19, 2001

(54) IMAGE TAKING OPTICAL SYSTEM (75) Inventor: Tetsuo Kohno, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/419,662

(22) Filed: Oct. 18, 1999

(30) Foreign Application Priority Data

Oct. 20, 1998 (JP) ................................................ 10-297931

(51) Int. Cl.$^7$ .................................................. G02B 27/10
(52) U.S. Cl. ......................... 359/618; 359/691; 359/640
(58) Field of Search ................................... 359/687, 629, 359/640, 690, 691

(56) References Cited

U.S. PATENT DOCUMENTS

| | | | |
|---|---|---|---|
| 4,867,549 | 9/1989 | Sekine | 350/572 |
| 5,404,247 | * 4/1995 | Cobb et al. | 359/662 |
| 5,680,249 | 10/1997 | Ishikawa et al. | 359/434 |
| 5,703,716 | 12/1997 | Furuta | 359/431 |
| 6,101,043 | * 8/2000 | Kohno et al. | 359/687 |

FOREIGN PATENT DOCUMENTS

| | | |
|---|---|---|
| 61-210312 | 9/1986 | (JP). |
| 63-205626 | 8/1988 | (JP). |
| 7-253537 | 10/1995 | (JP). |
| 8-114742 | 5/1996 | (JP). |

* cited by examiner

*Primary Examiner*—Georgia Epps
*Assistant Examiner*—Tim Thompson
(74) *Attorney, Agent, or Firm*—Burns, Doane, Swecker & Mathis, LLP (57) ABSTRACT

An image taking optical system including a main optical system for forming an object image; and an image splitting unit for dividing an image without re-forming the image formed by the main optical system. The image splitting unit includes sequentially from the object side a performance correcting optical system and an image splitting unit, and satisfies the following conditional equation:

$$-0.25 < \phi h \times Y s < 0.25$$

$$0.8 < \beta h < 1.2$$

where $\phi h$ represents the optical power of the performance correcting optical system, $Y s$ represents the maximum image height by the image splitting unit, and $\beta h$ represents the transverse magnification of the performance correcting optical system.

20 Claims, 6 Drawing Sheets

FIG. 4(a) Spherical Aberration / Sine Condition, FNO=4.10

FIG. 4(b) Astigmatism, Y'=13.2

FIG. 4(c) Distortion %, Y'=13.2

(M)

FIG. 4(d) Spherical Aberration / Sine Condition, FNO=5.23

FIG. 4(e) Astigmatism, Y'=13.2

FIG. 4(f) Distortion %, Y'=13.2

(T)

FIG. 4(g) Spherical Aberration / Sine Condition, FNO=5.67

FIG. 4(h) Astigmatism, Y'=13.2

FIG. 4(i) Distortion %, Y'=13.2

IMAGE TAKING OPTICAL SYSTEM

CROSS-REFERENCE TO RELATED APPLICATION

The present application is based on Application No. 10-297931 filed in Japan, the content of which is hereby incorporated by reference.

BACKGROUND OF THE INVENTION

1. Field of the Invention

The present invention relates to a taking optical system for cameras, and specifically relates to a taking optical system having an image-splitting image sensing unit for sensing divisions or parts of an image formed by an exchangeable lens.

2. Description of Related Art

In conjunction with the popularization of personal computers in recent years, digital still cameras for taking images which are easily stored on floppy disks and the like have become widely used. With the increasing popularity of digital still cameras, there has been demand for enlargement of the photographic range, and concomitant demand for photographic lenses of various specifications. In the field of recording images on silver salt film, single lens reflex cameras have come to use a plurality of exchangeable taking lenses (exchangeable lenses), and there has been a corresponding demand for taking lenses of various specifications.

If exchangeable lenses for single lens reflex cameras can be used with digital still cameras using an photoelectric conversion element, it is possible to respond to the demand for such photographic lenses. One specific method, for example, arranges a direct photoelectric conversion element on the image forming plane of an exchangeable lens. Japanese Laid-Open Patent Application Nos. 63-205626 and 7-253537 disclose other methods wherein a condenser lens is arranged near the image plane of an exchangeable lens, and a relay optical system is provided for re-forming an image formed by the exchangeable lens.

In such methods which arrange a direct photoelectric conversion element on the image forming plane of an exchangeable lens, an extremely large photoelectric conversion element having a large number of pixels is required to obtain the full optical capabilities of the exchangeable lens by having a screen size similar to that of silver salt film. Such a large photoelectric conversion element is prohibitively expensive and difficult to apply to consumer products.

The constructions disclosed in Japanese Laid-Open Patent Application Nos. 63-205626 and 7-253537 are disadvantageous inasmuch as the taking optical system is greatly enlarged by the inposition of a relay optical system so as to re-form the image formed by the exchangeable lens.

SUMMARY OF THE INVENTION

An object of the present invention is to provide an improved taking optical system for cameras.

Another object of the present invention is to provide a compact taking optical system for cameras capable of using exchangeable lenses, and which is suitable for producing high quality images.

These objects are attained by a taking optical system comprising a main optical system for forming an object image, and an image splitting unit for dividing an image without re-forming the image formed by the main optical system, wherein the image splitting unit comprises sequentially from the object side a performance correcting positive lens and a split prism, and satisfies the following conditional equation:

$$-0.25 < \phi h \times Ys < 0.25$$

$$0.8 < \beta h < 1.2$$

where $\phi h$ represents the optical power of the performance enhancing lens, $Ys$ represents the maximum image height by the image-splitting unit, and $\beta h$ represents the transverse magnification of the performance correcting lens.

BRIEF DESCRIPTION OF THE DRAWINGS

These and other objects and features of this invention will become clear from the following description taken in conjunction with the preferred embodiments with reference to the accompanying drawings, in which.

DETAILED DESCRIPTION OF THE PREFERRED EMBODIMENTS

Figure 1:
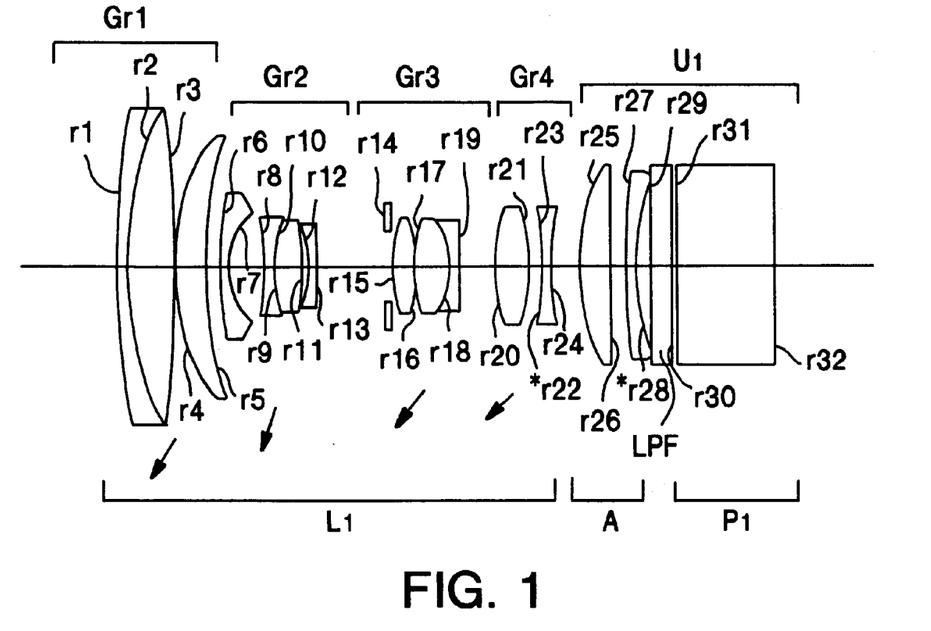
FIG. 1 shows the construction of the taking optical system of a first embodiment.
Figure 2:
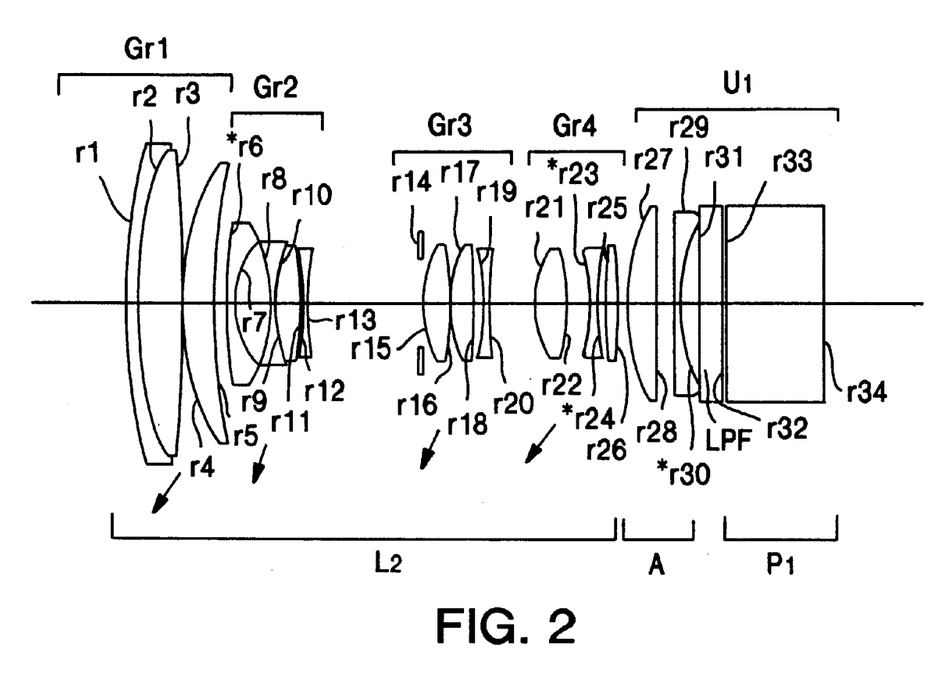
FIG. 2 shows the construction of the taking optical system of a second embodiment.
Figure 3:
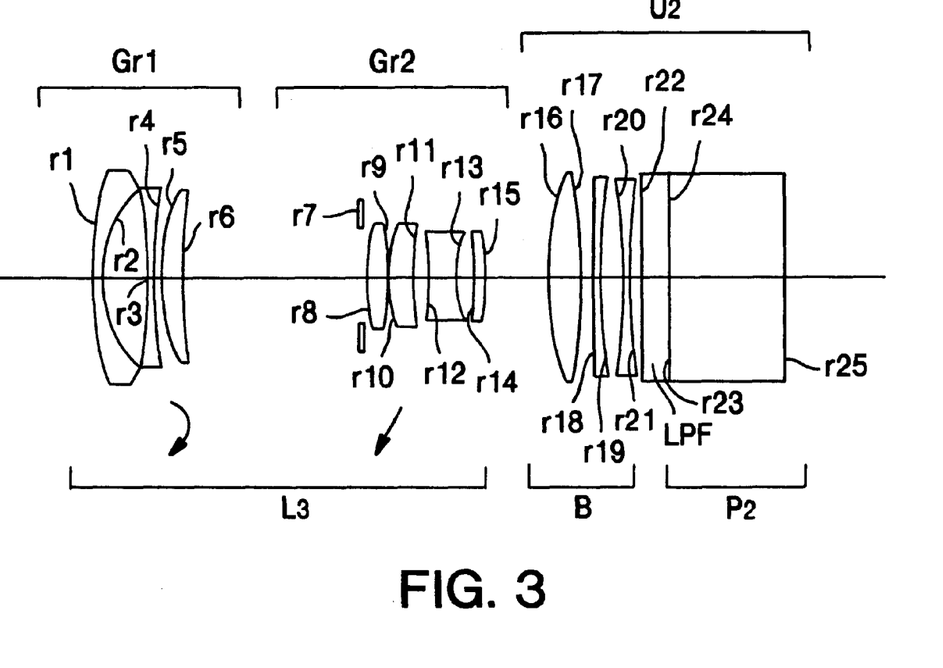
FIG. 3 shows the construction of the taking optical system of a third embodiment.
Figure 4A:
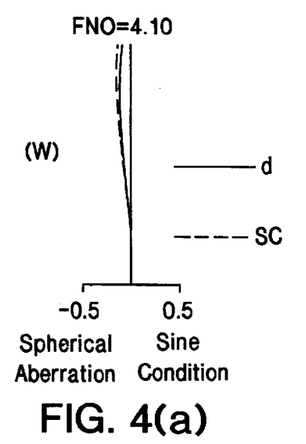
FIGS. 4a through i show aberration diagrams at infinity corresponding to the first embodiment.
Figure 4B:
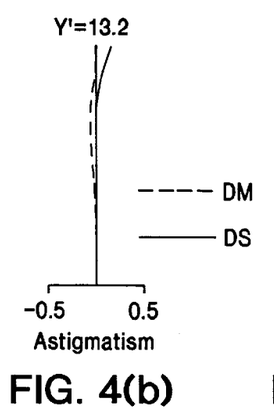
Figure 4C:
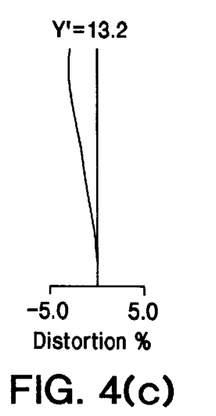
Figure 4D:
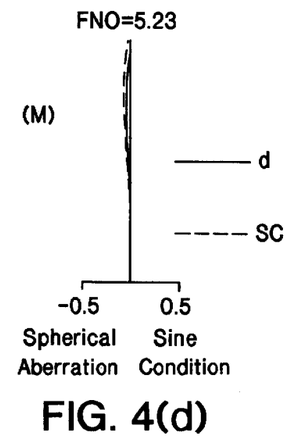
Figure 4E:
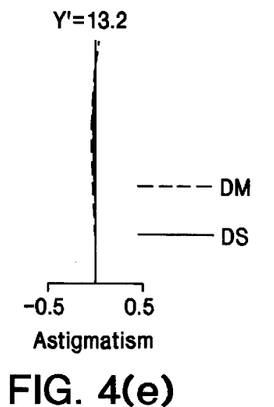
Figure 4F:
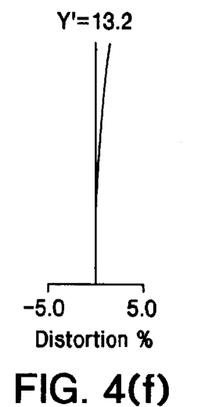
Figure 4G:
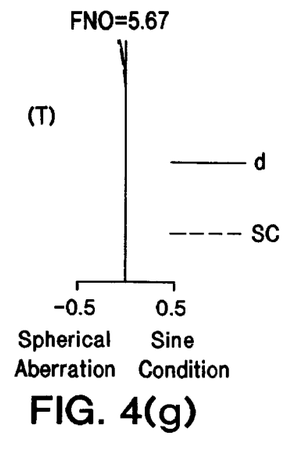
Figure 4H:
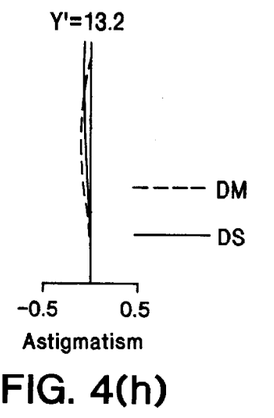
Figure 4I:
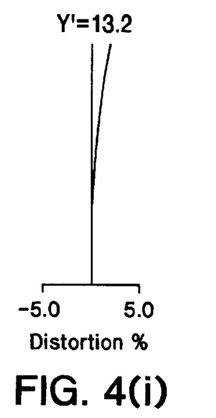
Figure 5A:
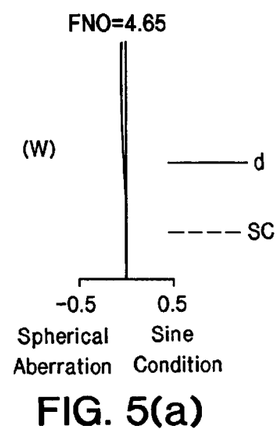
FIGS. 5a through i show aberration diagrams at infinity corresponding to the second embodiment.
Figure 5B:
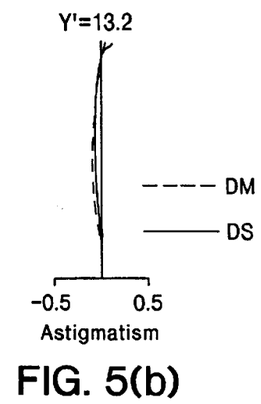
Figure 5C:
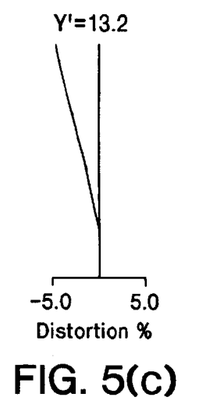
Figure 5D:
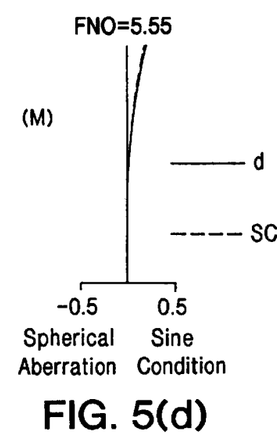
Figure 5E:
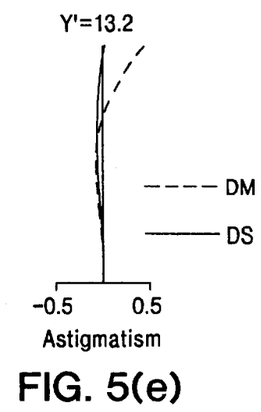
Figure 5F:
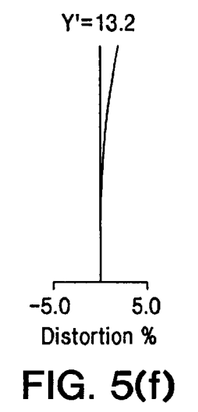
Figure 5G:
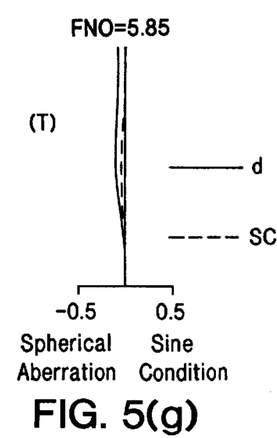
Figure 5H:
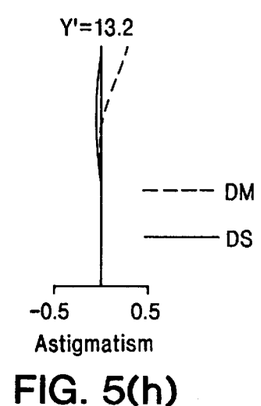
Figure 5I:
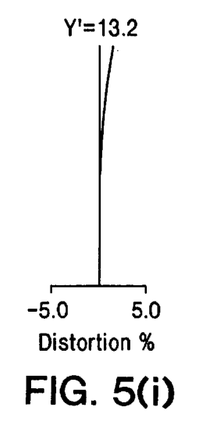
Figure 6A:
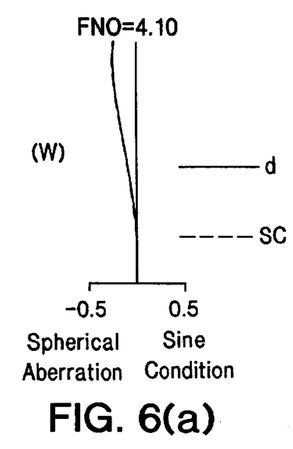
FIGS. 6a through i show aberration diagrams at infinity corresponding to the third embodiment.
Figure 6B:
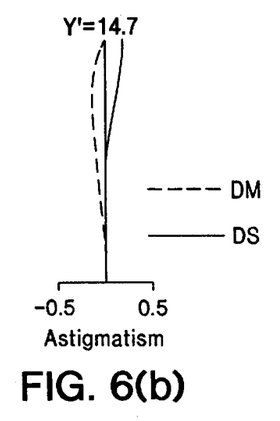
Figure 6C:
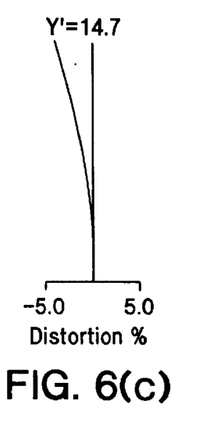
Figure 6D:
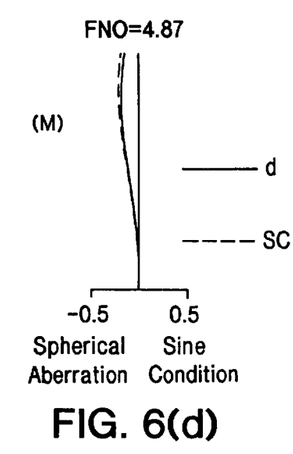
Figure 6E:
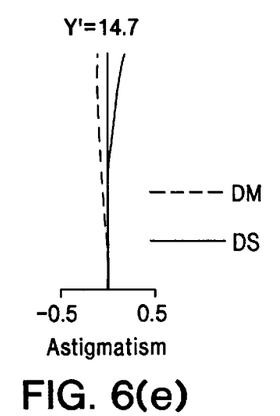
Figure 6F:
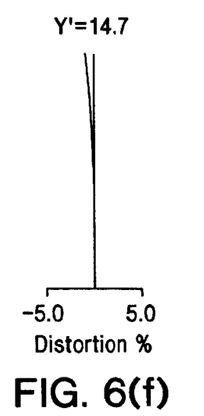
Figure 6G:
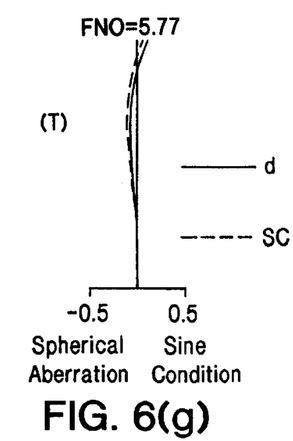
Figure 6H:
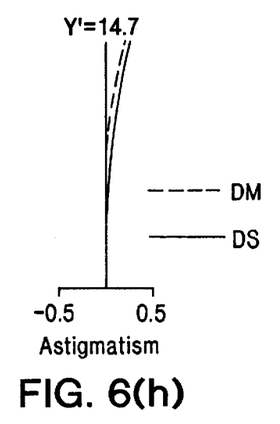
Figure 6I:
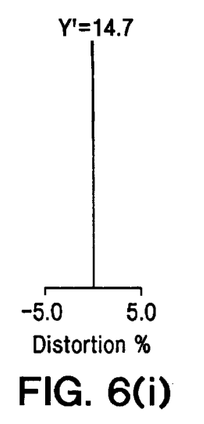

The embodiments of the present invention are described hereinafter with reference to the accompanying drawings. FIGS. 1 through 3 show the constructions of the taking optical systems of the first through the third embodiments, respectively. Arrows in the drawings schematically represent the direction of movement of each lens element during the zooming operation described later. Each drawing shows conditions at the wide angle end during zooming.

In the first embodiment shown in FIG. 1, a main optical system unit L1 is provided with an image-splitting image sensing unit U1. The left side in the drawing is the object side and the right side is the image side. In the drawing, the image-splitting image sensing unit U1 comprises sequentially from the object side a performance correcting optical system A, a low-pass filter unit LPF, and an image-splitting prism P1. The performance correcting optical system A comprises sequentially from the object side a positive meniscus lens having a convex surface on the object side, and a negative meniscus lens having a concave surface on the image side.

The main optical system unit L1 is a zoom lens comprising sequentially from the object side a first lens element Gr1, a second lens element Gr2, a third lens element Gr3, and a fourth lens element Gr4, wherein all lens elements move simply to the object side as indicated by the arrows in the drawing when zooming from the wide angle end to the telephoto end.

In the second embodiment shown in FIG. 2, a main optical system unit L2 is provided with the image-splitting image sensing unit U1. Similar to the first embodiment, the left side of the drawing is the object side, and the right side is the image side. In the drawing, the main optical system L2 is a zoom lens comprising sequentially from the object side a first lens element Gr1, a second lens element Gr2, a third lens element Gr3, and a fourth lens element Gr4, and all lens elements move simply to the object side as indicated by the arrows in the drawing when zooming from the wide angle side to the telephoto side.

In the third embodiment shown in FIG. 3, a main optical system unit L3 is provided with an image-splitting image sensing unit U2. Similar to the first embodiment, the left side of the drawing is the object side, and the right side is the image side. In the drawing, the image-splitting image sensing unit U2 comprises sequentially from the object side a performance correcting lens unit B, a low-pass filter LPF, and an image-splitting prism P2. The performance correcting lens unit B comprises sequentially from the object side a biconvex lens, a negative meniscus lens having a concave surface on the image side, and a biconcave lens.

The main optical system unit L3 is a zoom lens comprising sequentially from the object side a first lens element Gr1, and a second lens element Gr2, wherein the first lens element Gr1 moves once to the image side, then moves again to the object side, and the second lens element Gr2 moves simply to the object side as indicated by the arrows in the drawing when zooming from the wide angle end to the telephoto end. The image-splitting unit U1 also is applicable to the main optical system unit L3, and the image-splitting unit U2 also is applicable to the main optical system units L1 and L2. Accordingly, each of the main optical system units are mutually exchangeable.

Although a low-pass filter is disposed medially to the performance correcting lens and the image-splitting prism in the previously described embodiments, the low-pass filter also may be disposed medially to the image-splitting prism and a photoelectric conversion element described later. In this instance a low-pass filter unit is required for each of the divided light fluxes. The low-pass filter unit may be omitted, or a low-pass filter using a diffraction element may be used depending on the performance requirements.

Figure 7:
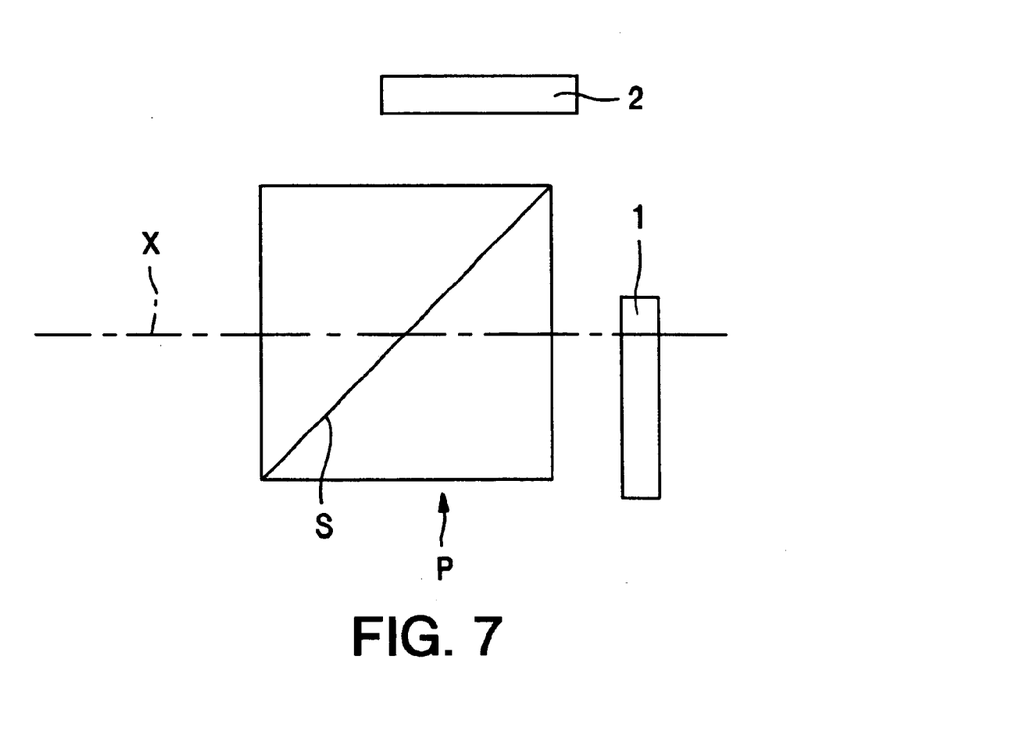
FIG. 7 illustrates sensing of the respective halves of a split image by the photoelectric conversion element.
Figure 8:
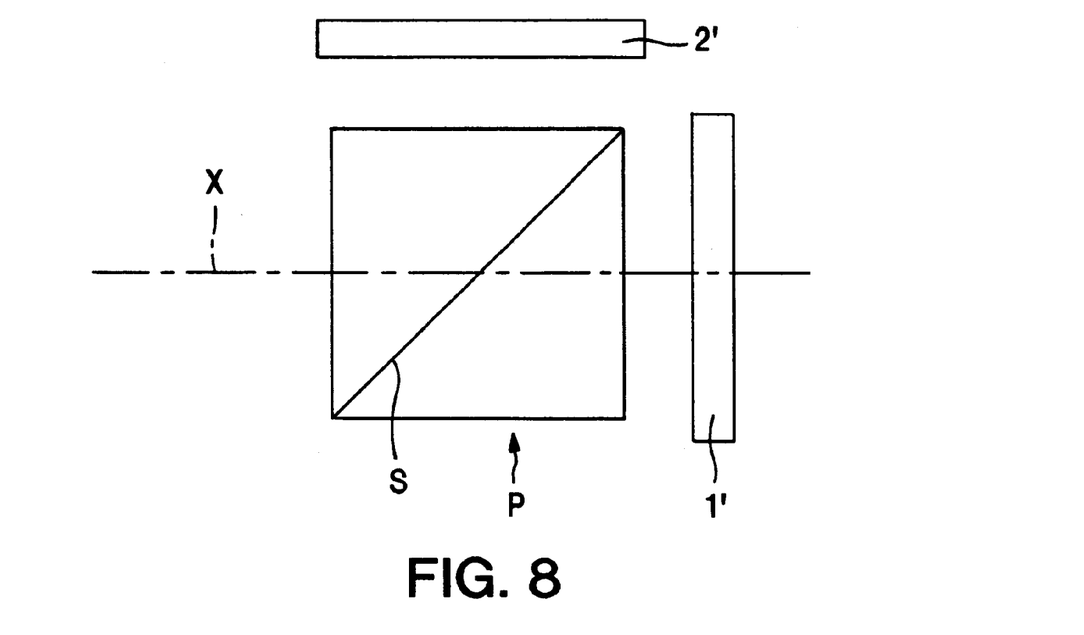
FIG. 8 illustrates sensing of the total split image by the photoelectric conversion element.

The previously mentioned image splitting prism is described in detail below. FIGS. 7 and 8 schematically show the positional relationship of the image-splitting prism and the photoelectric conversion element. As shown in the drawings, the image-splitting prism P is formed by cementing two prisms on an inclined adhering surface S, and the adhering surface S is provided with a vacuum deposition layer which permits equally balanced transmission light and reflected light.

FIG. 7 illustrates sensing of the respective halves of a split image by the photoelectric conversion element. In the drawing, illumination is from the left side of the drawing along the optical axis X indicated by the dashed line. Light from a photographic object not shown in the illustration forms an image on a photoelectric conversion element 1 via light transmitted through the splitting prism P in the bottom half, and forms an image on the photoelectric conversion element 2 via light reflected by the splitting prism P in the top half. According to this construction, a compact photoelectric conversion element can be used, thereby reducing cost. The images from the top and bottom halves are joined electronically in, for instance, a known manner.

FIG. 8 illustrates sensing of the total split image by the photoelectric conversion element. In the drawing, illumination is from the left side of the drawing along the optical axis X indicated by the dashed line. Light from a photographic object not shown in the illustration forms an image on a photoelectric conversion element 1' via all light transmitted through the splitting prism P, and forms an image on the photoelectric conversion element 2' via all light reflected by the splitting prism P. At this time, the obtained image quality is greater than the original photoelectric conversion element due to the pixels of one photoelectric conversion element being offset relative to counterpart pixels of the other photoelectric conversion elements, thus attaining higher image quality through electronic image integration techniques.

FIGS. 9 and 10 disclose two other embodiments for sensing the total split image by photoelectric conversion elements. In FIG. 9, the respective portions of a split image by the photoelectric conversion element are taken from the middle and at the edges of the photoelectric conversion elements. In the drawing, illumination is from the left side of the drawing along the optical axis X indicated by the dashed line. Light from a photographic object not shown in the illustration forms an image on a photoelectric conversion element 1" via light transmitted through the splitting prism P in the center portion, and forms an image on the photoelectric conversion element 2" via light reflected by the splitting prism P in the edge portions adjacent the center portion. According to this construction, a compact photoelectric conversion element can be used, thereby reducing cost. The images from the different portions are joined electronically in, a known manner.

FIG. 10 illustrates sensing of the total split image by the photoelectric conversion element. In the drawing, illumination is from the left side of the drawing along the optical axis X indicated by the dashed line. Light from a photographic object not shown in the illustration forms an image on a photoelectric conversion element 1''' via all light transmitted through the splitting prism P, and forms an image on the photoelectric conversion element 2''' via light reflected by the splitting prism P. Additionally, light forms an image on a third photoelectric conversion element 3 via all light reflected by the splitting prism P in a direction different than the light reflected from the prism towards the second photoelectric conversion element 2'''. The light can be divided by wavelength (e.g., RGB). At this time, the obtained image quality is greater than the original photoelectric conversion element due to the separation of the color images, thus attaining higher image quality through electronic image integration techniques. However, it is also possible to separate the images on the three (or two using the embodiment of FIG. 8) photoelectric conversion elements, which are activated or read sequentially, for instance. In this manner, the speed required by the photoelectric conversion elements for taking images could be increased to one third the time taken to take three images using one photoelectric conversion element in this example.

The previously mentioned performance correcting optical system is described below. In general, when a glass is inserted in an aberration-corrected optical system, the light ray optical path length changes so as to produce a markedly adverse affect mainly on extra-axial performance and various types of aberration such as color aberration and curvature of field to the over side. Accordingly, when the aforesaid image-splitting prism is inserted on the image plane side relative to the independently used exchangeable lens, aberration degradation is generated. The performance correcting optical system functions to correct the aberration degradation generated by the insertion of the image splitting prism on the image plane side.

The performance correcting optical systems should satisfy the following conditions. It is desirable that the performance correcting optical system of each of the aforesaid embodiments satisfies conditional equation (1):

$$-0.25 < \phi h \times Ys < 0.25 \tag{1}$$

where $\phi h$ represents the optical power of the performance correcting optical system, and Ys represents the maximum image height by the image-splitting prism.

Conditional equation (1) stipulates the optical power of the performance correcting optical system. When the lower limit of conditional equation (1) is exceeded, there is a pronounced negative tendency of distortion. Conversely, when the upper limit is exceeded, there is a marked positive tendency of distortion.

It is further desirable that the performance correcting optical systems of the aforesaid embodiments satisfies conditional equation (2) below:

$$0.8 < \beta h < 1.2 \tag{2}$$

where $\beta h$ represents the transverse magnification of the performance correcting optical system.

Conditional equation (2) stipulates the magnification of the performance correcting optical system. In this instance, magnification is nearly 1:1. When the lower limit of conditional equation (2) is exceeded, magnification becomes too small, back focus is reduced, and it becomes difficult to ensure adequate space for the splitting prism. Conversely, when the upper limit is exceeded, the screen size becomes larger and necessitates the use of a large screen photoelectric conversion element, thereby increasing cost.

It is desirable that the lens having the strongest positive optical power of the performance correcting optical system of the aforesaid embodiments satisfies conditional equation (3) below:

$$0.10 < \phi P \times Ys < 0.60 \tag{3}$$

where $\phi P$ represents the optical power of the positive lens.

When the lower limit of conditional equation (3) is exceeded, the optical power is too weak, such that multiple positive power lenses are required to attain a desired aberration correction, thereby increasing cost. Conversely, when the upper limit is exceeded, the optical power becomes excessive and spherical aberration tends to fall markedly on the under side.

It is further desirable that the aforesaid positive lens satisfies conditional equations (4) and (5) below:

$$1.45 < NdP \tag{4}$$

$$30 < vdP \tag{5}$$

Where Nd represents the refractive index relative to the d-line, and vd represents the Abbe number. Conditional equations (4) and (5) stipulate the glass material of the positive lens, and are conditions which maintain suitable Petzval sum and color aberration.

It is desirable that the lens having the strongest negative optical power of the performance correcting optical system of the aforesaid embodiments satisfies conditional equation (6) below in addition to conditional equation (3):

$$-0.60 < \phi N \times Ys < -0.1 \tag{6}$$

where $\phi N$ represents the optical power of the negative lens.

When the upper limit of conditional equation (6) is exceeded, the optical power is too weak, such that multiple negative power lenses are required to attain a desired aberration correction, thereby increasing cost. Conversely, when the lower limit is exceeded, the optical power becomes excessive and spherical aberration tends to fall markedly on the over side (i.e., toward the positive side in an aberration diagram).

It is desirable that the aforesaid negative power lens satisfies conditional equation (7) and (8) below in addition to conditional equations (4) and (5).

$$1.55 < NdN \tag{7}$$

$$45 < vdN \tag{8}$$

Conditional equations (7) and (8) stipulate the glass material of the negative lens, and are conditions which maintain suitable Petzval sum and color aberration.

When an aspherical surface is used in the performance correcting optical system, it is desirable that the aspherical surface satisfies conditional equation (9) below:

$$-0.01 < (X-X0)/(N'-N) < -0.0001 \tag{9}$$

where X represents the displacement in the optical axis direction at height Y of the effective optical path diameter expressed in equation (a) below, X0 represents the displacement in the optical axis direction at height Y of the effective optical path diameter expressed by equation (b) below, N' represents the refractive index of the aspherical surface on the image side, and N represents the refractive index of the aspherical surface on the object side. The equations below express the surface shape of the aspherical surface described later.

The performance correcting optical systems of the present invention corrects performance degradation arising from the insertion of glass, and the performance degradation is mainly the degradation of extra-axial performance. When an aspherical surface is provided, it object is mainly for correcting extra-axial performance, such that conditional equation (9) may be evaluated at a representative screen height of 0.7 which influences extra axial flux. The aspherical surface is particularly effective in dealing with curvature of field and distortion.

When the lower limit of conditional equation (9) is exceeded, curvature of field falls to the over side and there is a marked tendency of pin-cushion distortion. Conversely, when the upper limit is exceeded, curvature of filed fall to the under side and there is a pronounced tendency of barrel distortion. When a plurality of aspherical surfaces are used, the other aspherical surfaces combine other aberrations regardless of whether or not conditional equation (9) is satisfied.

The structure of the taking optical system of the present invention is described below by way of specific examples with construction data and aberration diagrams. The first through the third examples correspond to the previously described first through the third embodiments, and the lens structural diagrams (FIGS. 1–3) showing the first through the third embodiments respective show the lens structures of the first through the third examples correspondingly therewith.

In the examples, the reference symbol ri (i=1,2,3 . . .) represents the radius of curvature of the No. i surface counting from the object side, di (i=1,2,3 . . .) represents the axial distance of the No. i surface counting from the object side, Ni (i=1,2,3 . . .) and vi (i=1,2,3 . . .) respectively represent the refractive index on the d-line and the Abbe Number of the No. i lens counting from the object side. In each example, the focal length of the main optical system, the total system focal length f, the total system F-number FNO, the spacing between the first lens element and the second lens element, the spacing between the second lens element and the third lens element, the spacing between the third lens element and the fourth lens element, and the spacing between the last lens element of the main optical system unit and the performance correcting lens unit correspond sequentially from the left to values at the wide angle end (W), intermediate focal length (M), and telephoto end (T). In each example, surfaces marked by an asterisk (*) appended to the radius of curvature are aspherical surfaces, and the equations expressing the surface shape of the aspherical surfaces are defined below:

$$X = X0 + \Sigma A_i Y^2 \quad (a)$$

$$X_0 = Cy^2 / \{1 + (1 - \epsilon C^2 Y^2)^{1/2}\} \quad (b)$$

where X represents the displacement from a reference surface in the optical axis direction, Y represents the height in a direction perpendicular to the optical axis, C represents the paraxial curvature, $\epsilon$ represents the secondary curvature parameter, and Ai represents the aspherical coefficient of the i order.

EMBODIMENT 1

L1 = 22.5 mm ~ 50.5 mm ~ 78.0 mm Focal length of main optical system
f = 20.2 mm ~ 45.5 mm ~ 70.2 mm Focal length of toal optical system
FNO = 4.10 ~ 5.23 ~ 5.67 F number

| [Radius of Curvature] | [Axial Distance] | [Refractive Index (Nd)] | [Abbe Number(vd)] |
|---|---|---|---|
| r1 = 138.245 | | | |
| | d1 = 1.300 | N1 = 1.83350 | v1 = 21.00 |
| r2 = 54.039 | | | |
| | d2 = 6.090 | N2 = 1.58913 | v2 = 61.11 |
| r3 = −242.248 | | | |
| | d3 = 0.100 | | |
| r4 = 30.432 | | | |
| | d4 = 4.500 | N3 = 1.75450 | v3 = 51.57 |
| r5 = 61.106 | | | |
| | d5 = 1.870 ~ 14.942 ~ 22.023 | | |
| r6 = 50.477 | | | |
| | d6 = 1.000 | N4 = 1.83400 | v4 = 37.05 |
| r7 = 10.300 | | | |
| | d7 = 4.800 | | |
| r8 = −37.077 | | | |
| | d8 = 1.000 | N5 = 1.75450 | v5 = 51.57 |
| r9 = 19.409 | | | |
| | d9 = 0.210 | | |
| r10 = 16.272 | | | |
| | d10 = 3.700 | N6 = 1.79850 | v6 = 22.60 |
| r11 = −42.917 | | | |
| | d11 = 0.917 | | |
| r12 = −16.998 | | | |
| | d12 = 1.300 | N7 = 1.69680 | v7 = 56.47 |
| r13 = −83.356 | | | |
| | d13 = 9.767 ~ 4.197 ~ 1.780 | | |
| r14 = ∞ (diaphragm) | | | |
| | d14 = 0.800 | | |
| r15 = 24.573 | | | |
| | d15 = 3.200 | N8 = 1.61720 | v8 = 54.00 |
| r16 = −28.989 | | | |
| | d16 = 0.100 | | |
| r17 = 28.797 | | | |
| | d17 = 4.800 | N9 = 1.51680 | v9 = 64.20 |
| r18 = −12.357 | | | |
| | d18 = 1.339 | N10 = 1.80741 | v10 = 31.59 |
| r19 = 105.532 | | | |
| | d19 = 5.400 ~ 1.669 ~ 1.089 | | |
| r20 = 28.973 | | | |
| | d20 = 4.760 | N11 = 1.58267 | v11 = 46.43 |
| r21 = −19.633 | | | |

EMBODIMENT 1-continued

L1 = 22.5 mm ~ 50.5 mm ~ 78.0 mm Focal length of main optical system
f = 20.2 mm ~ 45.5 mm ~ 70.2 mm Focal length of toal optical system
FNO = 4.10 ~ 5.23 ~ 5.67 F number

| [Radius of Curvature] | [Axial Distance] | [Refractive Index (Nd)] | [Abbe Number(vd)] |
|---|---|---|---|
| | d21 = 1.588 | | |
| r22* = −167.579 | | | |
| | d22 = 0.040 | N12 = 1.51790 | v12 = 52.31 |
| r23 = −167.579 | | | |
| | d23 = 1.400 | N13 = 1.80741 | v13 = 31.59 |
| r24 = 29.320 | | | |
| | d24 = 4.180 ~ 17.541 ~ 22.191 | | |
| r25 = 32.298 | | | |
| | d25 = 4.194 | N14 = 1.62346 | v14 = 32.23 |
| r26 = 1607.174 | | | |
| | d26 = 2.540 | | |
| r27 = 171.729 | | | |
| | d27 = 1.100 | N15 = 1.84666 | v15 = 23.82 |
| r28* = 31.216 | | | |
| | d28 = 2.500 | | |
| r29 = ∞ | | | |
| | d29 = 3.200 | N16 = 1.51680 | v16 = 64.20 |
| r30 = ∞ | | | |
| | d30 = 0.500 | | |
| r31 = ∞ | | | |
| | d31 = 13.800 | N17 = 1.51680 | v17 = 64.20 |
| r32 = ∞ | | | |

[Aspherical coefficient of 22th surface (r22)]
$\epsilon = 0.10000 \times 10$
$A4 = -0.11449 \times 10^{-3}$
$A6 = -0.40063 \times 10^{-6}$
$A8 = 0.19296 \times 10^{-11}$
$A10 = -0.80550 \times 10^{-11}$
$A12 = 0.60989 \times 10^{-13}$

[Aspherical coefficient of 28th surface (r28)]
$\epsilon = 0.10000 \times 10$
$A4 = -0.41378 \times 10^{-6}$
$A6 = 0.10694 \times 10^{-7}$
$A8 = -0.23259 \times 10^{-10}$

EMBODIMENT 2

L3 = 22.5 mm ~ 60.0 mm ~ 156.0 mm Focal length of main optical system
f = 20.2 mm ~ 54.0 mm ~ 140.4 mm Focal length of total optical system
FNO = 4.65 ~ 5.55 ~ 5.85 F number

| [Radius of Curvature] | [Axial Distance] | [Refractive Index (Nd)] | [Abbe Number(vd)] |
|---|---|---|---|
| r1 = 92.166 | | | |
| | d1 = 1.400 | N1 = 1.83350 | v1 = 21.00 |
| r2 = 56.497 | | | |
| | d2 = 6.150 | N2 = 1.49310 | v2 = 83.58 |
| r3 = −319.060 | | | |
| | d3 = 0.100 | | |
| r4 = 39.303 | | | |
| | d4 = 4.650 | N3 = 1.60311 | v3 = 60.74 |
| r5 = 109.947 | | | |
| | d5 = 1.500 ~ 18.054 ~ 32.384 | | |
| r6* = 109.947 | | | |
| | d6 = 1.300 | N4 = 1.76683 | v4 = 49.47 |
| r7 = 14.774 | | | |
| | d7 = 4.500 | | |
| r8 = −32.796 | | | |
| | d8 = 0.900 | N5 = 1.75450 | v5 = 51.57 |
| r9 = 28.512 | | | |
| | d9 = 0.080 | | |
| r10 = 23.140 | | | |
| | d10 = 2.950 | N6 = 1.83350 | v6 = 21.00 |
| r11 = −104.975 | | | |
| | d11 = 0.600 | | |
| r12 = −62.052 | | | |

EMBODIMENT 2-continued

L3 = 22.5 mm ~ 60.0 mm ~ 156.0 mm Focal
length of main optical system
f = 20.2 mm ~ 54.0 mm ~ 140.4 mm Focal length of total optical system
FNO = 4.65 ~ 5.55 ~ 5.85 F number

| [Radius of Curvature] | [Axial Distance] | [Refractive Index (Nd)] | [Abbe Number(vd)] |
|---|---|---|---|
| | d12 = 0.800 | N7 = 1.69680 | ν7 = 56.47 |
| r13 = 51.335 | | | |
| | d13 = 15.741 ~ 7.622 ~ 1.500 | | |
| r14 = ∞ (diaphragm) | | | |
| | d14 = 0.500 | | |
| r15 = 18.507 | | | |
| | d15 = 3.850 | N8 = 1.51742 | ν8 = 52.15 |
| r16 = −56.171 | | | |
| | d16 = 0.080 | | |
| r17 = 18.468 | | | |
| | d17 = 3.250 | N9 = 1.48749 | ν9 = 70.44 |
| r18 = −360.023 | | | |
| | d18 = 1.650 | | |
| r19 = −26.148 | | | |
| | d19 = 0.900 | N10 = 1.84666 | ν10 = 23.82 |
| r20 = 58.214 | | | |
| | d20 = 6.550 ~ 3.307 ~ 0.700 | | |
| r21 = 16.626 | | | |
| | d21 = 4.550 | N11 = 1.51742 | ν11 = 52.15 |
| r22 = −24.842 | | | |
| | d22 = 3.350 | | |
| r23* = −19.913 | | | |
| | d23 = 1.300 | N12 = 1.76683 | ν12 = 49.47 |
| r24* = 1607.252 | | | |
| | d24 = 0.950 | | |
| r25 = 222.986 | | | |
| | d25 = 1.250 | N13 = 1.67339 | ν13 = 29.25 |
| r26 = −85.731 | | | |
| | d26 = 1.731 ~ 20.594 ~ 35.822 | | |
| r27 = 32.298 | | | |
| | d27 = 4.194 | N14 = 1.62346 | ν14 = 32.23 |
| r28 = 1607.174 | | | |
| | d28 = 2.540 | | |
| r29 = 171.729 | | | |
| | d29 = 1.100 | N15 = 1.84666 | ν15 = 23.82 |
| r30* = 31.216 | | | |
| | d30 = 2.500 | | |
| r31 = ∞ | | | |
| | d31 = 3.200 | N16 = 1.51680 | ν16 = 64.20 |
| r32 = ∞ | | | |
| | d32 = 0.500 | | |
| r33 = ∞ | | | |
| | d33 = 13.800 | N17 = 1.51680 | ν17 = 64.20 |
| r34 = ∞ | | | |

[Aspherical coefficient of 6th surface (r6)]
ε = 0.10000 × 10
A4 = −0.29128 × $10^{-6}$
A6 = −0.53706 × $10^{-7}$
A8 = 0.71320 × $10^{-9}$
A10 = −0.37618 × $10^{-11}$
A12 = 0.57958 × $10^{-14}$
[Aspherical coefficient of 23th surface (r23)]
ε = 0.10000 × 10
A4 = 0.19235 × $10^{-4}$
A6 = −0.43123 × $10^{-6}$
A8 = 0.66528 × $10^{-8}$
A10 = −0.11019 × $10^{-9}$
A12 = −0.35292 × $10^{-12}$
[Aspherical coefficient of 24th surface (r24)]
ε = 0.10000 × 10
A4 = 0.11942 × $10^{-3}$
A6 = −0.11184 × $10^{-6}$
A8 = 0.44019 × $10^{-8}$
A10 = −0.31761 × $10^{-10}$
A12 = −0.77476 × $10^{-12}$
[Aspherical coefficient of 30th surface (r30)]
ε = 0.10000 × 10

EMBODIMENT 2-continued

L3 = 22.5 mm ~ 60.0 mm ~ 156.0 mm Focal
length of main optical system
f = 20.2 mm ~ 54.0 mm ~ 140.4 mm Focal length of total optical system
FNO = 4.65 ~ 5.55 ~ 5.85 F number

| [Radius of Curvature] | [Axial Distance] | [Refractive Index (Nd)] | [Abbe Number(vd)] |
|---|---|---|---|

A4 = −0.41378 × $10^{-6}$
A6 = 0.10694 × $10^{-7}$
A8 = −0.23259 × $10^{-10}$

EMBODIMENT 3

L3 = 28.8 mm 39.6 mm 54.4 mm Focal length of main optical system
f = 28.8 mm 39.6 mm 54.3 mm Focal length of total optical system
FNO = 4.1 ~ 4.87 ~ 5.77 F number

| [Radius of Curvature] | [Axial Distance] | [Refractive Index (Nd)] | [Abbe Number(vd)] |
|---|---|---|---|
| r1 = 43.616 | | | |
| | d1 = 1.400 | N1 = 1.67003 | ν1 = 47.15 |
| r2 = 16.000 | | | |
| | d2 = 6.100 | | |
| r3 = −89.833 | | | |
| | d3 = 1.200 | N2 = 1.74400 | ν2 = 44.93 |
| r4 = 90.321 | | | |
| | d4 = 1.100 | | |
| r5 = 29.006 | | | |
| | d5 = 3.200 | N3 = 1.70055 | ν3 = 30.11 |
| r6 = 125.790 | | | |
| | d6 = 24.105 ~ 11.294 ~ 2.000 | | |
| r7 = ∞ (diaphragm) | | | |
| | d7 = 1.000 | | |
| r8 = 32.893 | | | |
| | d8 = 2.400 | N4 = 1.69100 | ν4 = 54.75 |
| r9 = −68.245 | | | |
| | d9 = 0.150 | | |
| r10 = 16.011 | | | |
| | d10 = 3.500 | N5 = 1.62280 | ν5 = 56.88 |
| r11 = 34.207 | | | |
| | d11 = 2.300 | | |
| r12 = −108.225 | | | |
| | d12 = 4.000 | N6 = 1.80518 | ν6 = 25.43 |
| r13 = 15.185 | | | |
| | d13 = 2.100 | | |
| r14 = 161.817 | | | |
| | d14 = 2.000 | N7 = 1.63980 | ν7 = 34.55 |
| r15 = −25.266 | | | |
| | d15 = 8.545 ~ 16.053 ~ 26.472 | | |
| r16 = 44.996 | | | |
| | d16 = 4.154 | N8 = 1.62396 | ν8 = 32.18 |
| r17 = −129.963 | | | |
| | d17 = 1.607 | | |
| r18 = 413.440 | | | |
| | d18 = 1.000 | N9 = 1.85000 | ν9 = 40.04 |
| r19 = 64.990 | | | |
| | d19 = 2.981 | | |
| r20 = −119.252 | | | |
| | d20 = 1.000 | N10 = 1.84666 | ν10 = 23.82 |
| r21 = 92.550 | | | |
| | d21 = 1.626 | | |
| r22 = ∞ | | | |
| | d22 = 3.500 | N11 = 1.51680 | ν11 = 64.20 |
| r23 = ∞ | | | |
| | d23 = 0.500 | | |
| r24 = ∞ | | | |
| | d22 = 15.000 | N12 = 1.51680 | ν12 = 64.20 |
| r25 = ∞ | | | |

FIGS. 4 through 6 are aberration diagrams at infinity corresponding to the first through third embodiments, respectively, and in each diagram the top level shows the wide angle end (W), the middle level shoes the intermediate focal length (M), and the bottom level shows the telephoto end (T). In the spherical aberration diagrams, the solid line d represents the d-line, the w dashed line (sc) represents the sine condition. In the aspherical aberration diagrams, the solid line DS and the dashed line DM represent the astigmatism of the sagittal surface and the meridional surface, respectively. Examples 1 through 3 satisfy conditional equations (1) through (8). Table 1 below shows values corresponding to conditional equations (1) (3), and (6) of the performance correcting lens units A and B.

TABLE 1

|  | OPTICAL SYSTEM A | OPTICAL SYSTEM B |
|---|---|---|
| $\phi h \times Ys$ | −0.0093 | −0.0920 |
| $\phi P \times Ys$ | 0.250 | 0.272 |
| $\phi N \times Ys$ | −0.292 | −0.293 |

Values which satisfy conditional equation (9) are shown below. Y is the maximum image height of the aspherical surface.

TABLE 2

| (Embodiment 1,2) | |
|---|---|
| HEIGHT | (X-X0)/(N'-N) |
| 0.70 Y | −0.00116 |

The optical surfaces of the optical systems of the previously described embodiments are all surfaces utilizing a deflection action of the light rays via refraction by surfaces having different refractive indices, but the present invention is not limited to this arrangement inasmuch as lenses using a deflection action of rays via diffraction at predetermined parameters and optical surfaces of a refraction/diffraction hybrid type also may be used insofar as such surfaces are included within the essential scope of the present invention.

Although the present invention has been fully described by way of examples with reference to the accompanying drawings, it is to be noted that various changes and modification will be apparent to those skilled in the art. For instance, the invention has been described with reference to electronic imaging devices such as CCDs. However, the invention is useful for other imaging medium, such any size or type of electronic imaging devices or chemical imaging devices or films. Therefore, unless otherwise such changes and modifications depart from the scope of the present invention, they should be construed as being included therein.

What is claimed is:

1. An image taking optical system comprising:
a main optical system for forming an object image; and
an image splitting unit for dividing an image without re-forming the image formed by the main optical system, wherein the image splitting unit comprises sequentially from the object side a performance correcting optical system and an image splitting unit, and satisfies the following conditional equation:

$$-0.25 < \phi h \times Ys < 0.25$$

$$0.8 < \beta h < 1.2$$

where $\phi h$ represents the optical power of the performance correcting optical system, Ys represents the maximum image height by the image splitting unit, and $\beta h$ represents the transverse magnification of the performance correcting optical system.

2. An image taking optical system according to claim 1, further comprising a low-pass filter unit.

3. An image taking optical system according to claim 2, wherein said performance correcting optical system comprises at least one positive lens and at least one negative lens.

4. An image taking optical system according to claim 3, wherein said performance correcting optical system comprises sequentially from the object side a positive meniscus lens having a convex surface on the object side, and a negative meniscus lens having a concave surface on the image side.

5. An image taking optical system according to claim 1, wherein said performance correcting optical system comprises sequentially from the object side a biconvex lens, a negative meniscus lens having a concave surface on the image side, and a biconcave lens.

6. An image taking optical system according to claim 1, wherein said main optical system is an exchangeable lens.

7. An image taking optical system according to claim 1, wherein said main optical system is a zoom lens.

8. An image taking optical system according to claim 1, further comprising a first photoelectric conversion element which receives light transmitted through one portion of said image splitting unit, and a second photoelectric conversion unit which receives light reflected in another portion of said image splitting unit.

9. An image taking optical system according to claim 1, further comprising multiple photoelectric conversion elements which receive light transmitted through or reflected in said image splitting unit.

10. An image taking optical system according to claim 1, further comprising a first photoelectric conversion element which receives light transmitted through said image splitting unit, and a second photoelectric conversion unit which receives light reflected by said image splitting unit.

11. An image taking optical system according to claim 1, wherein the strongest positive optical power of the performance correcting optical satisfies conditional equation:

$$0.10 < \phi P \times Ys < 0.60$$

where $\phi P$ represents the optical power of the positive lens, and Ys represents the maximum image height by the image-splitting prism.

12. An image taking optical system according to claim 11, wherein the strongest negative optical power of the performance correcting optical system satisfies conditional equation:

$$-0.60 < \phi N \times Ys < -0.1$$

where $\phi N$ represents the optical power of the negative lens, and Ys represents the maximum image height by the image splitting unit.

13. An image taking optical system according to claim 11, wherein the performance correcting optical system includes a positive optical power lens having a strongest positive power and which satisfies conditional equations:

$$1.45 < NdP$$

$$30 < vdP$$

where NdP represents the refractive index relative to the d-line, and vdP represents the Abbe number of said strongest optical power positive lens.

14. An image taking optical system according to claim 11, wherein the performance correcting optical system includes a negative optical power lens having a strongest negative power and which satisfies conditional equation:

$$-0.60 < N \times Ys < -0.1$$

where φN represents the optical power of the negative lens, and Ys represents the maximum image height by the image splitting unit.

15. An image taking optical system according to claim 12, wherein said negative power lens satisfies conditional equation:

$$1.55 < NdN$$

$$45 < vdN$$

where NdN represents the refractive index relative to the d-line, and vdN represents the Abbe number of said strongest optical power negative lens.

16. An image taking optical system according to claim 14, wherein, when an aspherical surface is used in the performance correcting optical system, the aspherical surface satisfies conditional equation:

$$-0.01 < (X-X0)/(N'-N) < -0.0001$$

where X represents the displacement in the optical axis direction at height Y of the effective optical path diameter expressed in equation (a) below, X0 represents the displacement in the optical axis direction at height Y of the effective optical path diameter expressed by equation (b) below, N' represents the refractive index of the aspherical surface on the image side, and N represents the refractive index of the aspherical surface on the object side, and the following are equations expressing the surface shape of the aspherical surfaces:

$$X = X0 + \Sigma AiY^i \quad (a)$$

$$Xo = CY^2/\{1+(1-\epsilon C^2 Y^2)^{1/2}\} \quad (b)$$

where X represents the displacement from a reference surface in the optical axis direction, Y represents the height in a direction perpendicular to the optical axis, C represents the paraxial curvature, ε represents the secondary curvature parameter, and Ai represents the aspherical coefficient of the i order.

17. A camera system comprising:
   an image taking optical system according to claim 1; and
   an imaging medium.

18. A digital camera system comprising:
   an image taking optical system according to claim 1; and
   an imaging medium.

19. A digital camera according to claim 18, wherein said imaging medium includes multiple photoelectric conversion elements which receive light transmitted through or reflected in said image splitting unit.

20. An image splitting unit for dividing an image without re-forming the image formed by the main optical system, wherein the image splitting unit comprises sequentially from the object side a performance correcting optical system and an image splitting unit, and satisfies the following conditional equation:

$$-0.25 < \phi h \times Ys < 0.25$$

$$0.8 < \beta h < 1.2$$

where φh represents the optical power of the performance correcting optical system, Ys represents the maximum image height by the image splitting unit, and βh represents the transverse magnification of the performance correcting optical system.

* * * * *